United States Patent Office.

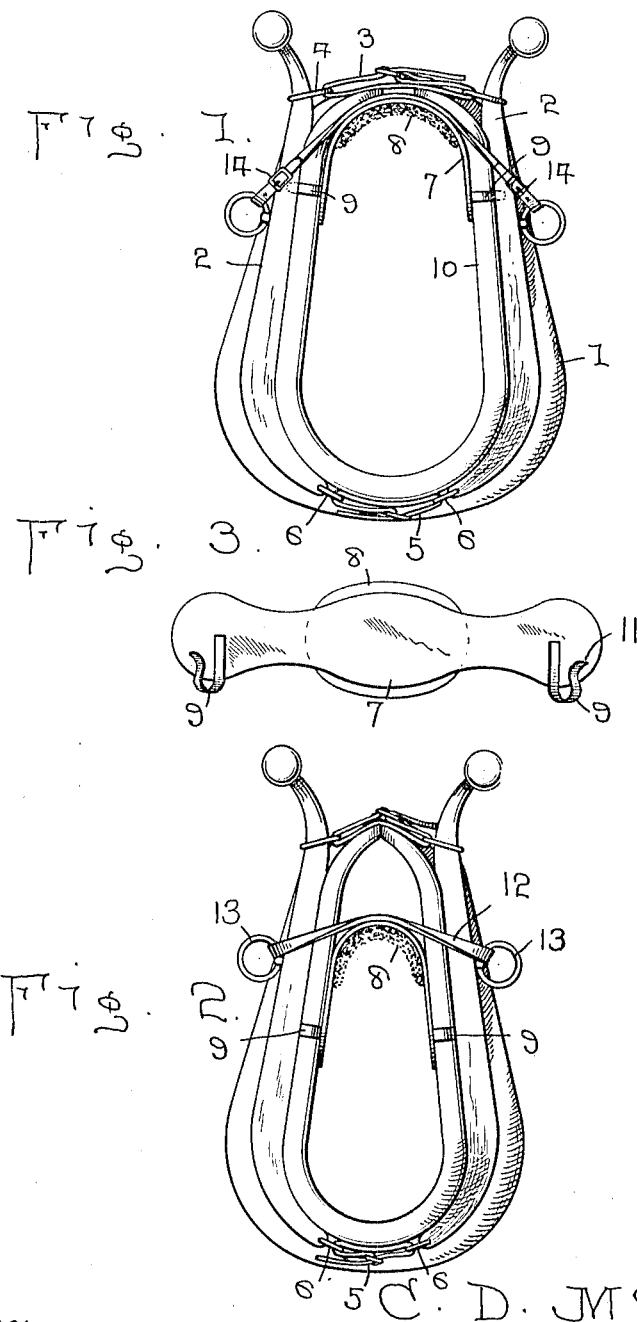

CHARLES D. McMILLAN, OF TEKAMAH, NEBRASKA.

ADJUSTABLE PAD FOR HORSE-COLLARS.

1,084,891.

Specification of Letters Patent. Patented Jan. 20, 1914.

Application filed July 27, 1912. Serial No. 711,823.

*To all whom it may concern:*

Be it known that I, CHARLES D. McMILLAN, a citizen of the United States, residing at Tekamah, in the county of Burt and State of Nebraska, have invented certain new and useful Improvements in Adjustable Pads for Horse-Collars; and I do hereby declare the following to be a full, clear, and exact description of the invention, such as will enable others skilled in the art to which it appertains to make and use the same.

My invention relates to a collar pad and adjusting means therefor, and my invention not only provides a reliably efficient collar pad to protect the neck of the animal but also in itself makes it possible to quickly adjust the size of the collar so as to fit the same for use upon animals of different sizes, and my prime object among others is to provide a simple attachment for a horse collar which will be found to readily serve the purpose of protecting the neck of the animal and in addition may be so used as to fit the collar, that it may be used upon a large or small animal, as desired.

A further object of my invention among others is to enable my collar attachment to be readily applied to use upon or in connection with the horse collar as now manufactured, without the necessity of altering said collar or the hames placed in coöperation therewith.

Other objects and advantages will be hereinafter made clearly apparent, reference being had to the accompanying drawings which are made a part of this application, and in which, Figure 1 shows my invention complete, ready for use upon a collar and employed simply as a collar pad. Fig. 2 is a similar view showing my improved collar pad adjustably secured upon the collar to the neck of a manner as to fit the collar to the neck of a small animal, and, Fig. 3 is a detail view showing my attachment complete, ready for use.

In order to conveniently refer to the various parts of my invention and coöperating elements, numerals will be employed, and referring to the numerals on the drawings, 1 indicates a horse collar of the usual or any preferred construction, while 2 designates the hames used in connection with the collar and also of the usual or any preferred character. The hames are connected at their upper end in the usual manner by a strap 3 and coöperating links 4, while the lower end of the hames are detachably connected in the same manner, as by a suitable strap 5, engaging with the usual form of links 6, carried by the ends of each hame member.

My improved pad consists of a body portion 7 which may be of leather or other suitable material and has attached thereto a cushion or pad proper 8, also of any preferred material as a piece of undressed sheep skin or heavy felt or the like, it being understood that said pad, thus or otherwise constructed, may be secured in any desired manner to the member 7, as by stitching, riveting or the like. The body portion 7 of my pad is provided at each end with the spring clamp 9 which is adapted to fit around the rib portion 10 of the collar, while the extreme end 11 of the clamp 9 is so shaped as to fit snugly under a contiguous part of the hame member, as the latter rests upon the collar in the usual manner. It therefore follows that by means of the clamping members 9, my improved pad may be moved upward in contact with the inner surface of the upper end of the collar, as shown in Fig. 1, or may be moved downward at any point upon the collar, as indicated in Fig. 2 of the drawings.

In order to hold the pad in an adjusted position, I provide the adjustable anchoring straps 12 which extend through the usual line rings 13, provided upon the hames, said straps being provided with a suitable buckle 14, as shown, or equivalent means for securing said strap in an adjusted position.

By reference to Fig. 2 of the drawing, it will be seen that the extreme upper ends of the collar are drawn tightly together while the pad member is located in such position upon the collar as to accommodate the neck of a smaller sized horse, mule or the like, it being understood that the clamping members 9 have their extreme ends disposed closely in contact with the collar and between the collar and the contiguous hame member. It is thought that in ordinary practice, the said clamping members 9 will be sufficient to hold the pad in any adjusted position though I deem it desirable to provide the anchoring strap 12, above described inasmuch as said strap may be brought to bear directly upon the upper end of the pad in its adjusted position and thereby prevent any upward movement of the pad incident to carrying the weight of the collar and the hames. By the arrangement of the strap 12, it will be seen that the usual office performed by the line rings 13 is in no wise interfered with.

Believing therefore that the construction and manner of using my invention have thus been made clearly apparent, further description is deemed unnecessary.

Having thus described my invention what I claim is:—

1. In combination, a horse collar, hames, means to adjustably secure the hames to said collar, a pad slidably positioned within said collar, means for slidably securing said pad to said collar, and an adjustable strap secured at its ends to said hames, said strap bearing on said pad for adjusting the same independently of the adjustment of said hames.

2. In combination, a horse collar, hame members, means to adjustably secure the hame members to said collar, line rings secured to the hame members, an adjustable curved pad member, flat spring clamps secured to each end of said pad member, said clamps each having a hooked portion fitting over and slidably engaging the ribbed portion of the collar and outwardly curved ends engaging the hame members between the inner sides thereof and the collar, and adjusting means for said pad member, said means comprising a strap arranged to fit over said pad member and adjustably secured at both ends to said line rings whereby said pad member may be adjusted independently of the adjustment of said hames.

In testimony whereof I have signed my name to this specification in the presence of two subscribing witnesses.

CHARLES D. McMILLAN.

Witnesses:
 TODD FALLEN,
 A. F. RHOADES.

---

Copies of this patent may be obtained for five cents each, by addressing the "Commissioner of Patents, Washington, D. C."